United States Patent [19]
White et al.

[11] 3,767,969
[45] Oct. 23, 1973

[54] FLASHING CIRCUITRY

[75] Inventors: Roby Byron White, Cumberland, R.I.; Frederic Samuel Tobey, Hyde Park, Mass.

[73] Assignee: W. H. Brady Co., Milwaukee, Wis.

[22] Filed: July 11, 1972

[21] Appl. No.: 270,659

Related U.S. Application Data

[63] Continuation-in-part of Ser. No. 122,930, March 10, 1971, abandoned.

[52] U.S. Cl............. 315/200 A, 315/238, 315/240, 315/241 R
[51] Int. Cl. ......................................... H05b 37/00
[58] Field of Search................ 315/238, 240, 241 R, 315/241 P, 200 A

[56] References Cited
UNITED STATES PATENTS
3,585,444   6/1971   Crowley............................. 315/240

*Primary Examiner*—Roy Lake
*Assistant Examiner*—James B. Mullins
*Attorney*—William W. Rymer, Jr.

[57] ABSTRACT

Actuating a flashtube with circuitry which delivers a rapid succession of individual flash-producing pulses, and prevents further pulsing after the desired number of flashes. Preferably, capacitors are used to repeatedly store and discharge energy for firing the flash tube and timing the pulse cycles, in conjunction with SCR gating.

11 Claims, 4 Drawing Figures

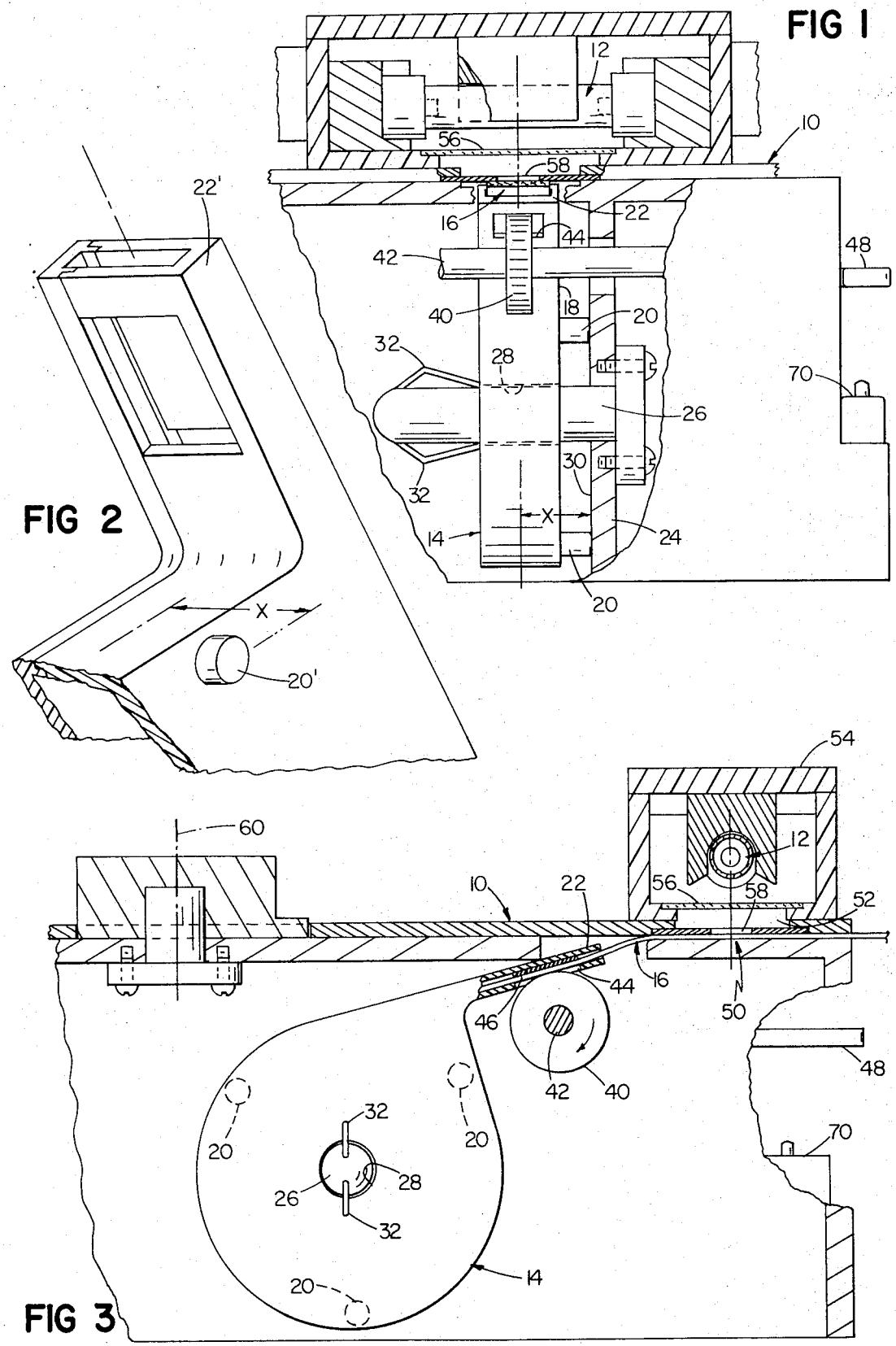

FLASHING CIRCUITRY

CROSS-REFERENCE TO RELATED APPLICATION

This application is a continuation in part of our now abandoned U.S. Pat. application Ser. No. 122,930, "Flashing Circuitry", filed Mar. 10, 1971, the benefit of which filing date is herein claimed.

BACKGROUND OF THE INVENTION

This invention relates to electrical circuitry for delivering a series of flash-producing electrical pulses to a flashtube in rapid succession.

SUMMARY OF THE INVENTION

In general the invention features in one aspect a circuit comprising energy circuitry for receiving electrical energy at a first voltage, storing the energy at a second voltage higher than the first voltage, and repeatedly discharging the stored energy to initiate the pulses, and timing circuitry to control the number of pulses in the series. In another aspect the invention features a step-up transformer connected to fire the flashtube, a first capacitor connected to repeatedly store up electrical energy and discharge into the primary winding of the transformer, a gating element connected between the first capacitor and the primary winding to control the discharge, and a second capacitor connected to store electrical energy while the first capacitor is storing the energy and to initiate actuation of the gating element upon the charting of the second capacitor to a predetermined voltage, thereby to permit the discharge. In yet another aspect the invention features energy circuitry for receiving alternating current and repeatedly storing and discharging electrical energy in flash cycles corresponding to the cycles of the current, firing circuitry for receiving during each flash cycle a portion of the energy discharged by the energy circuitry and repeatedly firing the flashtube, and timing circuitry for receiving during each cycle a portion of the energy discharged by the energy circuitry, accumulating the energy so received, and, when the energy so accumulated reaches a predetermined level, disabling the energy circuitry from further effectively discharging energy to the firing circuitry, whereby the series is terminated. In preferred embodiments the energy circuitry includes a capacitor for storing energy at the second voltage, lines arranged for receipt of alternating current, a second capacitor connected to store the energy at voltage rising to the first voltage during one portion of the alternating current cycle, and a gating element connected between the capacitors, the voltage at the second capacitor rising to above the first voltage upon reversal of the alternating current during a second portion of the cycle, the gating element during the second portion of the cycle permitting energy to flow from the second capacitor to the first mentioned capacitor, the second capacitor having a capacitance larger than that of the first mentioned capacitor; the timing circuitry includes a zener diode which limits receipt of energy from the energy circuitry to a peak voltage portion of each flash cycle, thereby to increase the sensitivity of the timing circuitry to fluctuations in the voltage level of the alternating current, a capacitor connected to receive energy from the energy circuitry, and a gating element connected to be actuated when that capacitor is charged to a predetermined voltage, the actuation of the gating element causing energy to be drawn from the energy circuitry to terminate the series of flashes; a resistor is connected between the timing and energy circuitries to limit the energy level increase per cycle in the timing circuitry, thereby to determine the number of the pulses in the series; a switch is provided to discharge the capacitor in the timing circuitry at the termination of each series of flashes, so that in each subsequent series approximately the same total energy will be delivered to the flashtube; and an SCR is connected as a gate to control the storage of electrical energy in the energy circuitry, elements being connected with the timing circuitry to maintain the SCR in an off condition upon termination of each series of flashes. Also, in preferred embodiments, a thermistor is mounted in heat transfer relationship with a capacitor so as to provide decreased resistance as the capacitor heats up, to counteract the characteristic of the warmer capacitor to deliver more energy per pulse.

The invention thus achieves reliable and accurate control of the number and energy level of the flash-producing pulses, and keeps approximately constant the total energy delivered to the flashtube per series of flashes, even when line voltage fluctuates, all with a minimum of circuit elements.

Other features and advantages of the invention will be apparent from the following description of the preferred embodiment thereof, taken together with the drawings.

BRIEF DESCRIPTION OF THE DRAWINGS

FIG. 1 is a vertical sectional view of a fragment of the processor;

FIG. 2 is an enlargement of a fragment of a tape cartridge of width different from that shown in FIG. 1;

FIG. 3 is a sectional view taken at 90° to the section of FIG. 1; and

DESCRIPTION OF THE PREFERRED EMBODIMENT

Figure 4:
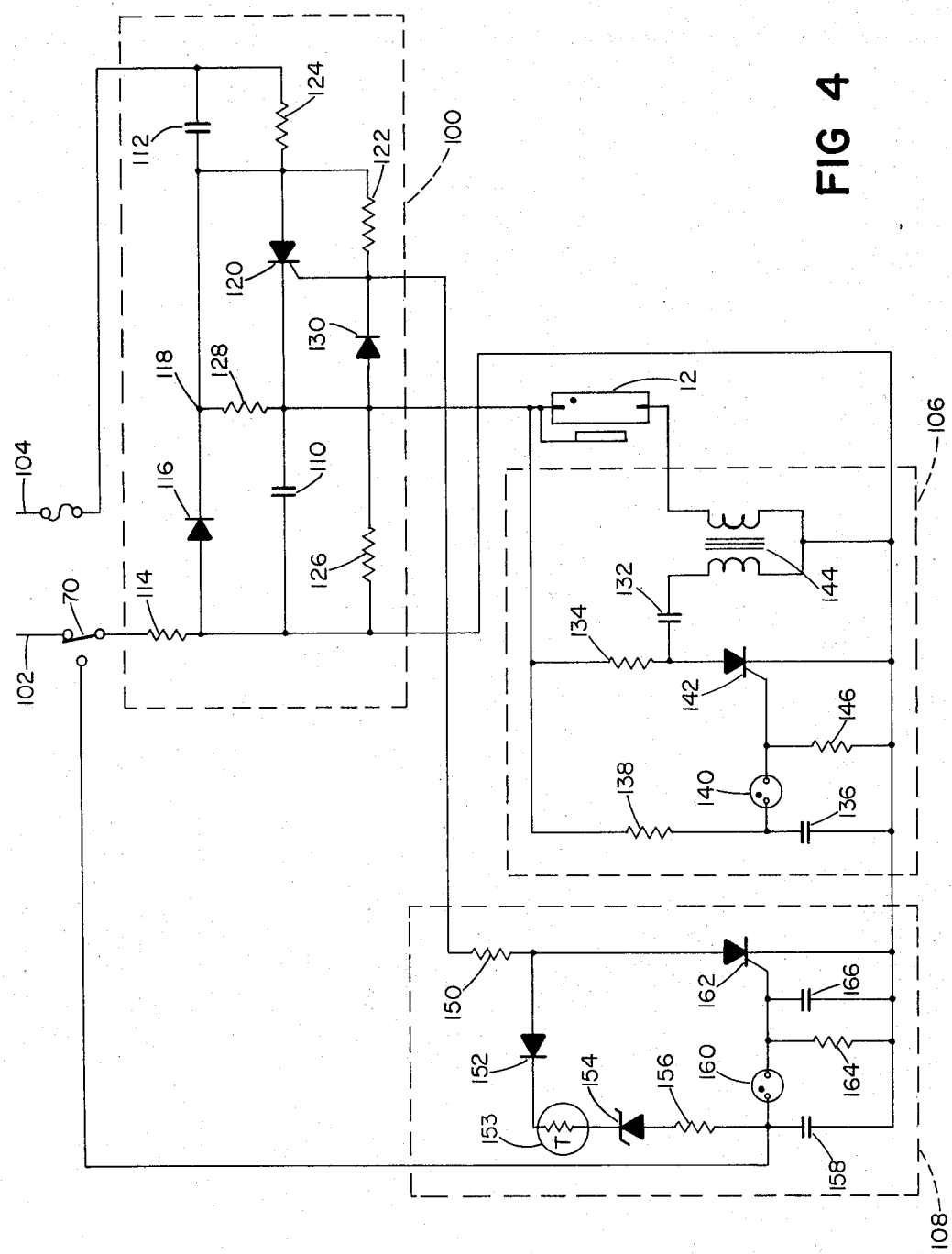
FIG. 4 is a schematic drawing of electrical circuitry for pulsing the flashtube.

Referring to the drawings, label making apparatus is shown in which a circular master stencil 10 is mounted between xenon arc flashtube 12 and cartridge 14 of ultraviolet imaging tape 16 (coated with a material sold by E. I. duPont de Nemours under the trade designation "Dylux"). The cartridge is of opaque plastic, has a side wall 18 from which protrude three identical exterior lugs 20, and has a tape guide 22 of inside width barely larger than the width of the tape. Secured to mounting bracket 24 is a post 26 which fits through opening 28 to support the cartridge with lugs 20 against bracket wall surface 30. The lugs are equally spaced angularly about opening 28 to vertically orient the cartridge, and are kept in contact with surface 20 by springs 32 on post 26.

Knurled tape indexing wheel 40 is carried by shaft 42 and presses against tape 16 through opening 44 in guide 22. A back-up tab 46 of Teflon is fixed to the inner guide surface opposite opening 44, to allow tape 16 to slide smoothly through the guide as wheel 40 rotates. Finger operated lever 48 is provided to rotate shaft 42 through conventional linkage (not shown).

Tape 16 extends from guide 22 to an imaging station 50 beneath aperture 52 at the bottom of flashtube housing 54. Filter 56 covers aperture 52 to screen out all light except that in the ultraviolet frequency range.

Stencil 10 is opaque except for characters (e.g., at 58) arranged along its periphery. The stencil can be rotated about axis 60 to bring a selected character into registry with flashtube 12.

An electrical circuit (shown in detail in FIG. 4), including switch 70 mounted beneath lever 48 of the index mechanism, is arranged to supply to flashtube 12, upon each actuation of switch 70, a rapid series (over a total period of about 400 milliseconds) of 25 electrical pulses each of 1.56 joules energy level (less than 5 percent of explosion energy) and 200 microseconds duration.

The cartridge shown in FIG. 2 is identical to that of FIGS. 1 and 3 except that guide 22' is wider than guide 22 (to accommodate a wider tape, omitted from FIG. 2), and lugs 20' are correspondingly shorter, so that the distance X between the ends of the lugs and the centerline of the tape guide is the same for all cartridges.

In use, a cartridge with tape of the desired width is loaded on post 26. With lugs 20 or 20' against surface 30, the centerline of guide 22 or 22' are hence the centerline of the tape, will be centered under aperture 52, whatever the width of the tape. To make a label, stencil (or imaging master) 10 is rotated to bring the desired character to imaging station 50, and lever 48 is depressed to close switch 70, causing flashtube 12 to flash 25 times as the 25 pulses described above are delivered. After exposure, lever 48 is released, rotating wheel 40 to advance tape 16. (Or, the tape can be advanced prior to imaging.) Successive characters are similarly imaged on the tape. Upon exposure to visible light the images on the tape become photographically fixed.

The low energy level (relative to explosion energy) pulsing of the tube prevents crazing, or extreme darkening of the flashtube envelope, or pressure loss, over a tube life of often millions of flashes, even though the total energy supplied in the serires of flashes which make up each character exposure equals a large fraction of explosion energy and the flashes follow each other so rapidly that most of the heat generated by each flash is still present in the tube when the succeeding flash occurs. At the same time, the total energy level of each character exposure is sufficient to give a dark image.

Image darkness can be controlled by varying the number of flashes per exposure.

The electrical circuitry for actuating the flashtube is shown in FIG. 4, and in general consists of a main energy circuit 100 for providing a series of flashes, timed in accordance with the frequency (50-60 Hz) of the AC line current applied through lines 102 and 104, a firing circuit 106 for firing the flashtube under the control of circuit 100, and a total cycle timing circuit 108 for terminating the series of flashes after the flashtube has fired the desired number of times.

In circuit 100, electrolytic capacitor 110 (60 mfd) is charged during each AC cycle, which provices the energy to trigger circuit 106. In particular, when switch 70 (single pole double throw) is depressed (as shown in FIG. 4) line current charges capacitor 112 (400 mfd) to near peak line voltage through resistor 114 (10 Ohm) and diode 116 during the first quarter of the AC cycle. During the second and third quarters of the AC cycle the voltage at junction 118 rises to approximately twice peak voltage (the sum of the reversed line voltage and that already present across capacitor 112), SCR 120 is turned on (and is kept on by 10K resistor 122), and a portion of the charge on capacitor 112 transfers to capacitor 110 (the ratio of charges of the two capacitors being in inverse proportion to the ratio of capacitances, so that the smaller capacitor 110 will be charged to above peak line voltage). Resistors 125 (100K) and 126 (220K) are bleed resistors to discharge capacitors 120 and 110 for safety purposes when the unit is turned off. Resistor 128 (2.2K) and diode 130 work in conjunction with circuit 108 as described below.

While capacitor 110 is being charged as just described it in turn charges, in circuit 106, capacitor 132 (0.33 mfd) through resistor 134 (3.3K), and capacitor 136 (0.022 mfd) through resistor 138 (1.2 meg.). When charged to approximately 70 volts, capacitor 136 fires neon tube 140, turning on SCR 142. As a result, capacitor 132 discharges into the primary of step-up transformer 144. The voltage across the transformer secondary then fires flashtube 12. The current through the flashtube causes SCR 142 to be reset. Ground reference resistor 146 (1K) prevents false firing of SCR 142.

During each flash-producing discharge of capacitor 110 current also flows through diode 130, resistor 150 (220 Ohms), diode 152, thermistor 153, zener diode 154 (120V), and resistor 156 (chosen to give the desired charging rate of capacitor 158, and hence the desired number of flashes per exposure) to charge capacitor 158 (0.1 mfd). Diode 152 prevents current leak from capacitor 158 between flashes, so that the voltage across capacitor 158 increases upon each flash, and eventually fires neon tube 160, turning on SCR 162 and causing discharge of capacitor 110, terminating the series of flashes. The voltage drop across diode 130 causes SCR 120 to turn off, and the continuing current flow through resistor 128 and diode 130 from capacitor 112 holds SCR 120 in its off condition. Resistor 156 controls the rate of charge of capacitor 158, hence determining the number of flashes per exposure. Zener diode 154 provides a threshold voltage below which current will not flow to capacitor 158, so that capacitor 158 charges during only a small peak portion of each AC cycle. As a result, the charge rate of capacitor 158 is sensitive to fluctuations in line voltage, so that the number of flashes per exposure will drop as line voltage increases, tending to equalize total energy supplied to the flashtube per exposure.

The thermistor 153 compensates for the fact that, even at unchanging line voltage, more energy is delivered per pulse as the components, in particular the capacitors 110 and 112, warm up. The thermistor 153, which is mounted in heat transfer relationship with capacitor 110, provides decreased resistance as capacitor 110 heats up, thus charging capacitor 158 a greater amount on each pulse, and thus diminishing the number of pulses in a way compensating for the increased energy per pulse owing to temperature increase.

Resistor 164 (1K) and capacitor 166 (0.047 mfd) prevent false firing of SCR 162.

When switch 70 is released capacitor 158 is discharged by the normally closed contacts of switch 70, so that the next exposure cycle will be of the same length.

Subject matter disclosed herein relating to positioning the cartridge and to the low friction back-up tab was the sole invention of Frederic S. Tobey.

Other embodiments are within the following claims.

What is claimed is:

1. An electrical circuit for delivering to a flashtube a series of flash-producing electrical pulses in rapid succession, comprising:

energy circuit means for repeatedly storing and discharging electrical energy in flash cycles corresponding to the cycles of an alternating current source, firing circuit means for receiving during each of said flash cycles a portion of said energy discharged by said energy circuit means and repeatedly firing said flashtube, timing circuit means for receiving during each of said cycles a portion of said energy discharged by said energy circuit means, accumulating energy so received, and, when said energy so accumulated reaches a predetermined level, disabling said energy circuit means from further effectively discharging energy to said firing circuit means to terminate said series, said energy circuit means being connected to receive said alternating current from a said source of the same and being connected to said firing circuit means and said timing circuit means for delivery of energy from said energy circuit means to said firing circuit means and said timing circuit means, said timing circuit means comprising a first capacitor connected to receive energy from said energy circuit means and a gating element connected to be actuated to cause said disabling thus to terminate said series when said capacitor is charged to a predetermined voltage, and said energy circuit means comprising a second capacitor connected to store in said energy circuit means said energy from said source of said alternating current, said timing circuit means being connected to draw energy from said second capacitor upon actuation of said gating element.

2. The circuit of claim 1 in which said energy circuit means includes a third capacitor, said third capacitor having a capacitance greater than said capacitor and being connected therewith to supply energy thereto to charge said second capacitor to a voltage higher than the voltage of said source.

3. The circuit of claim 2 in which a second gating element is connected between said second capacitor and said third capacitor, said second gating element during a second portion of said cycles permitting energy to flow from said third capacitor to said second capacitor.

4. The circuit of claim 1 which includes in said firing circuit means a step-up transformer connected to fire said flashtube, a second gating element between a third capacitor and a primary winding of said transformer, and a fourth capacitor connected to store energy while said first capacitor is storing energy, to initiate actuation of said second gating element upon the charging of said fourth capacitor to a predetermined voltage.

5. The circuit of claim 4 in which said fourth capacitor is connected in series with a neon tube, and said second gating element is an SCR connected to be turned on upon the breakdown of said neon tube when said fourth capacitor is charged to said predetermined voltage.

6. The circuit of claim 1 wherein said timing circuitry includes an element which limits receipt of energy from said energy circuitry to a peak voltage portion of each said flash cycle, thereby to increase the sensitivity of said timing circuitry to fluctuations in the voltage level of said alternating current.

7. The circuit of claim 6 wherein said element is a zener diode.

8. The circuit of claim 1 which includes a switch to discharge said first capacitor to terminate said series.

9. The circuit of claim 1 in which said timing circuit means includes a thermistor electrically connected for passage therethrough of said energy discharged by said energy circuit means, said thermistor being mounted in heat transfer relationship with said second capacitor.

10. An electrical circuit for delivering to a flashtube a series of flash-producing electrical pulses in rapid succession, comprising:

energy circuit means for repeatedly storing and discharging electrical energy in flash cycles corresponding to the cycles of an alternating current source, firing circuit means for receiving during each of said flash cycles a portion of said energy discharged by said energy circuit means and repeatedly firing said flashtube, timing circuit means for receiving during each of said cycles a portion of said energy discharged by said energy circuit means, accumulating energy so received, and, when said energy so accumulated reaches a predetermined level, disabling said energy circuit means from further effectively discharging energy to said firing circuit means to terminate said series, said energy circuit means being connected to receive said alternating current from a said source of the same and being connected to said firing circuit means and said timing circuit means for delivery of energy from said energy circuit means to said firing circuit means and said timing circuit means, said timing circuit means comprising a resistor connected between said energy circuit means and portions of said timing circuit means to limit energy level increase per cycle in said timing circuit means, thereby to determine the number of said pulses in said series.

11. An electrical circuit for delivering to a flashtube a series of flash-producing electrical pulses in rapid succession, comprising:

energy circuit means for repeatedly storing and discharging electrical energy in flash cycles corresponding to the cycles of an alternating current source, firing circuit means for receiving during each of said flash cycles a portion of said energy discharged by said energy circuit means and repeatedly firing said flashtube, timing circuit means for receiving during each of said cycles a portion of said energy discharged by said energy circuit means, accumulating energy so received, and, when said energy so accumulated reaches a predetermined level, disabling said energy circuit means from further effectively discharging energy to said firing circuit means to terminate said series, said energy circuit means being connected to receive said alternating current from a said source of the same and being connected to said firing circuit means and said timing circuit means for delivery of energy from said energy circuit means to said firing circuit means and said timing circuit means, said timing circuit means comprising a capacitor connected to receive said energy from said energy circuit means and a switch to discharge said capacitor to terminate said series.

* * * * *